United States Patent
Ikuta

(10) Patent No.: US 10,097,450 B2
(45) Date of Patent: Oct. 9, 2018

(54) RELAY DEVICE, CONFIGURATION METHOD, AND RECORDING MEDIUM

(71) Applicant: FUJITSU LIMITED, Kawasaki-shi, Kanagawa (JP)

(72) Inventor: Yuya Ikuta, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/284,588

(22) Filed: Oct. 4, 2016

(65) Prior Publication Data

US 2017/0171062 A1    Jun. 15, 2017

(30) Foreign Application Priority Data

Dec. 9, 2015   (JP) ................................ 2015-240121

(51) Int. Cl.
*H04L 12/709* (2013.01)
*H04L 12/801* (2013.01)

(52) U.S. Cl.
CPC ............ *H04L 45/245* (2013.01); *H04L 47/16* (2013.01); *Y02D 50/30* (2018.01)

(58) Field of Classification Search
CPC ........ H04L 45/245; H04L 47/16; Y02D 50/30
See application file for complete search history.

(56) References Cited

U.S. PATENT DOCUMENTS

| | | | |
|---|---|---|---|
| 8,462,774 B2* | 6/2013 | Page | H04L 45/245 370/369 |
| 2012/0033672 A1* | 2/2012 | Page | H04L 45/245 370/395.53 |
| 2012/0087372 A1* | 4/2012 | Narasimhan | H04L 45/245 370/392 |
| 2012/0182866 A1* | 7/2012 | Vinayagam | H04L 45/245 370/228 |
| 2013/0003549 A1* | 1/2013 | Matthews | H04L 41/0668 370/235 |
| 2013/0148546 A1* | 6/2013 | Eisenhauer | H04L 41/0806 370/255 |
| 2014/0355477 A1* | 12/2014 | Velayudhan | H04L 41/0806 370/254 |
| 2017/0126478 A1* | 5/2017 | Morris | H04L 41/0654 |

FOREIGN PATENT DOCUMENTS

| | | |
|---|---|---|
| JP | 2007-104512 | 4/2007 |
| JP | 2012-114644 | 6/2012 |

* cited by examiner

*Primary Examiner* — Wutchung Chu
(74) *Attorney, Agent, or Firm* — Fujitsu Patent Center

(57) ABSTRACT

A relay device includes a target port coupled to another device; and a processor coupled to the target port and configured to extract identification information on the other device and identification information on a link aggregation group (LAG) configuration applied to the other device, from a frame received through the target port, and determine LAG configuration to be applied to the target port based on the identification information on the other device and the identification information on the LAG configuration applied to the other device.

9 Claims, 24 Drawing Sheets

FIG. 2

| IDENTIFICATION INFORMATION | LAG CONFIGURATION |
|---|---|
| Default | DDDDD··· |
| A | aaaaa··· |
| B | bbbbb··· |
| C | ccccc··· |
| ⋮ | ⋮ |

FIG. 3

```
interface Port-channel 10
vlag ignore-split
mtu 3000
switchport
switchport mode access
switchport access vlan 1
spanning-tree shutdown
no shutdown
!
```

FIG. 5

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 1 | y | Connect | B |
| 14p | — | — | — | Connect now | — |

FIG. 8

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 1 | y | Connect | B |
| 14p | – | 1 | y | Get info | – |

FIG. 9

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 1 | y | Connect | B |
| 14p | — | 1 | y | Search | — |

FIG. 10

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 1 | y | Connect | B |
| 14p | 2 | 1 | y | Search | B |

FIG. 11

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 1 | y | LAG | B |
| 14p | 2 | 1 | y | LAG | B |

FIG. 13

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | — | — | — | loop | — |
| 14p | — | — | — | loop | — |

FIG. 15

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | — | — | — | disconnect | — |
| 14p | — | — | — | disconnect | — |

FIG. 17

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | — | — | disconnect | default |
| 14p | 2 | — | — | disconnect | default |

FIG. 19

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | — | — | connect | default |
| 14p | 2 | — | — | connect | default |

FIG. 20

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | 2 | 3 | z | LAG | default |
| 14p | 2 | 3 | z | LAG | default |

FIG. 22

| PORT | ACTOR KEY | PARTNER KEY | PARTNER SYSTEM | STATUS | CONFIG FILE |
|---|---|---|---|---|---|
| 11p | 1 | 1 | x | LAG | A |
| 12p | 1 | 1 | x | LAG | A |
| 13p | — | — | — | disconnect | — |
| 14p | 2 | — | — | connect | default |

RELAY DEVICE, CONFIGURATION METHOD, AND RECORDING MEDIUM

CROSS-REFERENCE TO RELATED APPLICATION

This application is based upon and claims the benefit of priority of the prior Japanese Patent Application No. 2015-240121, filed on Dec. 9, 2015, the entire contents of which are incorporated herein by reference.

FIELD

The embodiments disclosed herein are related to a relay device, a configuration method, and a recording medium.

BACKGROUND

Link aggregation group (LAG) technology is a kind of technology to provide a network path redundancy. The LAG technology treats plural physical lines as a virtual single line, thereby enhancing fault tolerance and realizing a wider bandwidth.

Configuration of a LAG (hereinafter referred to as LAG configuration) is complex. It is a troublesome task to manually perform a LAG configuration of each of the network devices on a network with consistency. A recent trend for a larger scale data center network and a virtualization of switches has accompanied a LAG configuration that extends across plural switches. LAG configuration is thus becoming increasingly complex.

The Japanese Laid-open Patent Publication No 2012-114644 discloses a technology by which a LAG configuration may be automatically performed for plural network repeaters. However, this technology assumes that a new function is introduced to both of a target network repeater and a network repeater coupled to the target network repeater.

SUMMARY

According to an aspect of the invention, a relay device includes a target port coupled to another device; and a processor coupled to the target port and configured to extract identification information on the other device and identification information on a link aggregation group (LAG) configuration applied to the other device, from a frame received through the target port, and determine LAG configuration to be applied to the target port based on the identification information on the other device and the identification information on the LAG configuration applied to the other device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of data stored in a LAG configuration storage unit;

FIG. 3 is a diagram illustrating an example of contents of a LAG configuration;

FIG. 5 is a diagram illustrating an example of data stored in a LAG management data storage unit;

FIG. 8 is a diagram illustrating an example of data stored in the LAG management data storage unit;

FIG. 9 is a diagram illustrating an example of data stored in the LAG management data storage unit;

FIG. 10 is a diagram illustrating an example of data stored in the LAG management data storage unit;

FIG. 11 is a diagram illustrating an example of data stored in the LAG management data storage unit;

FIG. 13 is a diagram illustrating an example of data stored in the LAG management data storage unit;

FIG. 15 is a diagram illustrating an example of data stored in the LAG management data storage unit;

FIG. 17 is a diagram illustrating an example of data stored in the LAG management data storage unit;

FIG. 19 is a diagram illustrating an example of data stored in the LAG management data storage unit;

FIG. 20 is a diagram illustrating an example of data stored in the LAG management data storage unit;

FIG. 22 is a diagram illustrating an example of data stored in the LAG management data storage unit;

DESCRIPTION OF EMBODIMENTS

Figure 1:
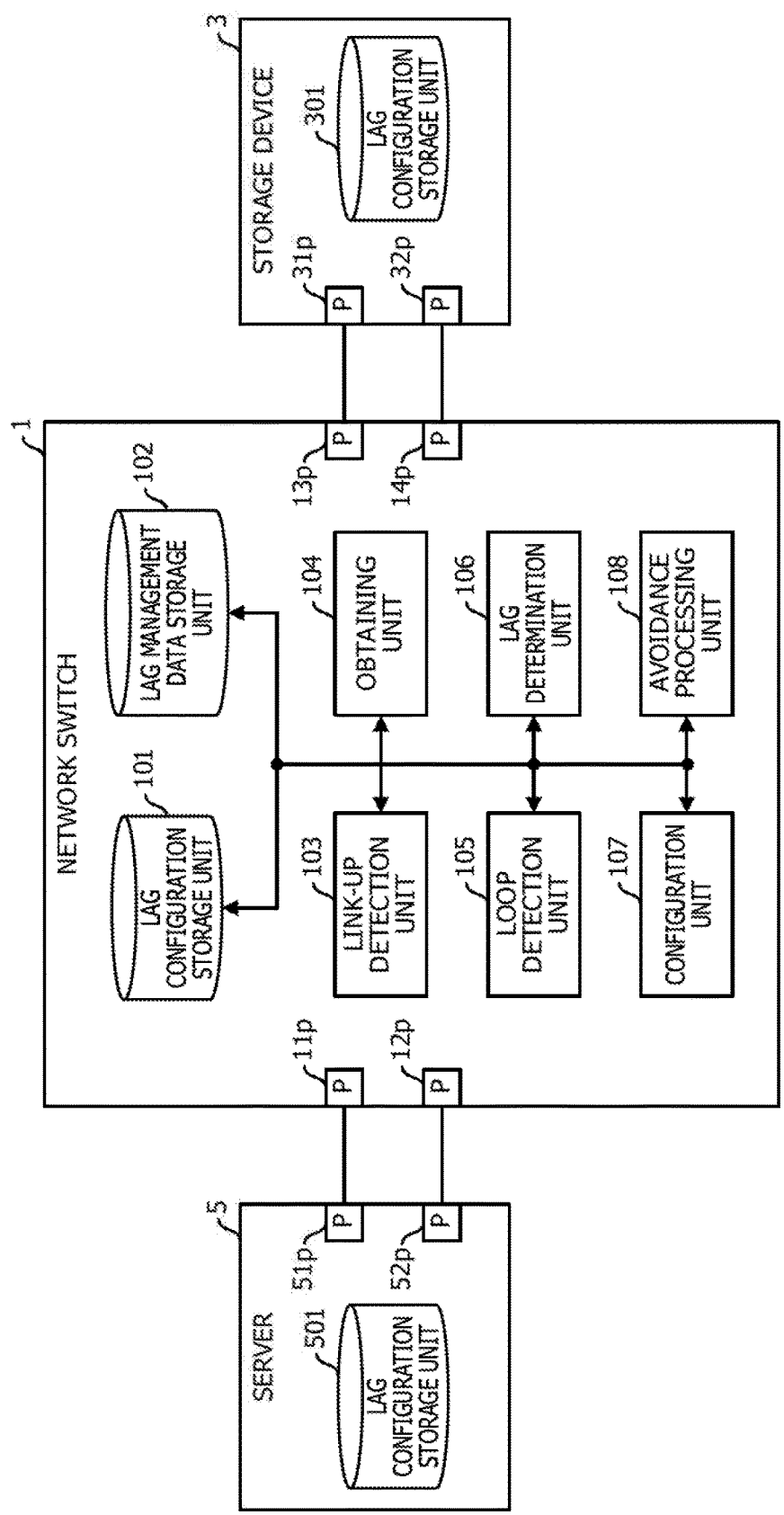
FIG. 1 is a diagram illustrating an overview of a system according to an embodiment.

FIG. 1 illustrates an overview of a system according to an embodiment. A storage device 3 and a server 5 are coupled to a network switch 1. Specifically, a port 11$p$ of the network switch 1 is coupled to a port 51$p$ of the server 5. A port 12$p$ of the network switch 1 is coupled to a port 52$p$ of the server 5. A port 13$p$ of the network switch 1 is coupled to a port 31$p$ of the storage device 3. A port 14$p$ of the network switch 1 is coupled to a port 32$p$ of the storage device 3. In FIG. 1, "P" indicates a port.

The network switch 1 includes the ports 11$p$ to 14$p$, a LAG configuration storage unit 101, a LAG management data storage unit 102, a link-up detection unit 103, an obtaining unit 104, a loop detection unit 105, a LAG determination unit 106, a configuration unit 107, and an avoidance processing unit 108.

The link-up detection unit 103 performs a processing to detect link-up of ports. The obtaining unit 104 performs a processing to extract information on a partner key and a partner system from a link aggregation control protocol (LACP) frame. The loop detection unit 105 performs a processing to detect an occurrence of a loop. The LAG determination unit 106 performs a processing to determine whether LAG configuration is applied to a port of a connection destination device. The configuration unit 107 performs a processing to apply LAG configuration to the ports 11p to 14p. The avoidance processing unit 108 performs a processing to deal with a loop that has been detected by the loop detection unit 105.

The server 5 includes the ports 51p and 52p and a LAG configuration storage unit 501. The storage device 3 includes the ports 31p and 32p and a LAG configuration storage unit 301.

FIG. 2 illustrates an example of data stored in the LAG configuration storage unit 101. In the example of FIG. 2, identification information to identify a LAG configuration file to apply to a port and contents of the LAG configuration file are stored in the LAG configuration storage unit 101. FIG. 3 illustrates an example of contents of the LAG configuration file. However, contents of the LAG configuration file are not limited to the example of FIG. 3, and the LAG configuration file may include information other than the information illustrated in FIG. 3 (for example, a partner key, an actor key, or the like in the LACP).

In the LACP, an "actor" refers to the device itself. A "partner" refers to a connection destination device. An actor key is information for identifying LAG configuration applied to a port of the device itself, which may be set to any value by the device. A partner key is information for identifying LAG configuration applied to a port of the connection destination device, which may be set to any value by the connection destination device. Namely, the partner key corresponds to an actor key of the connection destination device. Information on the partner system is information unique to a connection destination device (for example, a media access control (MAC) address). An actor key and identification information to identify a LAG configuration file correspond one to one to each other.

Data stored in the LAG configuration storage unit 501 and data stored in the LAG configuration storage unit 301 are similar to the data stored in the LAG configuration storage unit 101. Data stored in the LAG management data storage unit 102 is described later.

Figure 4:
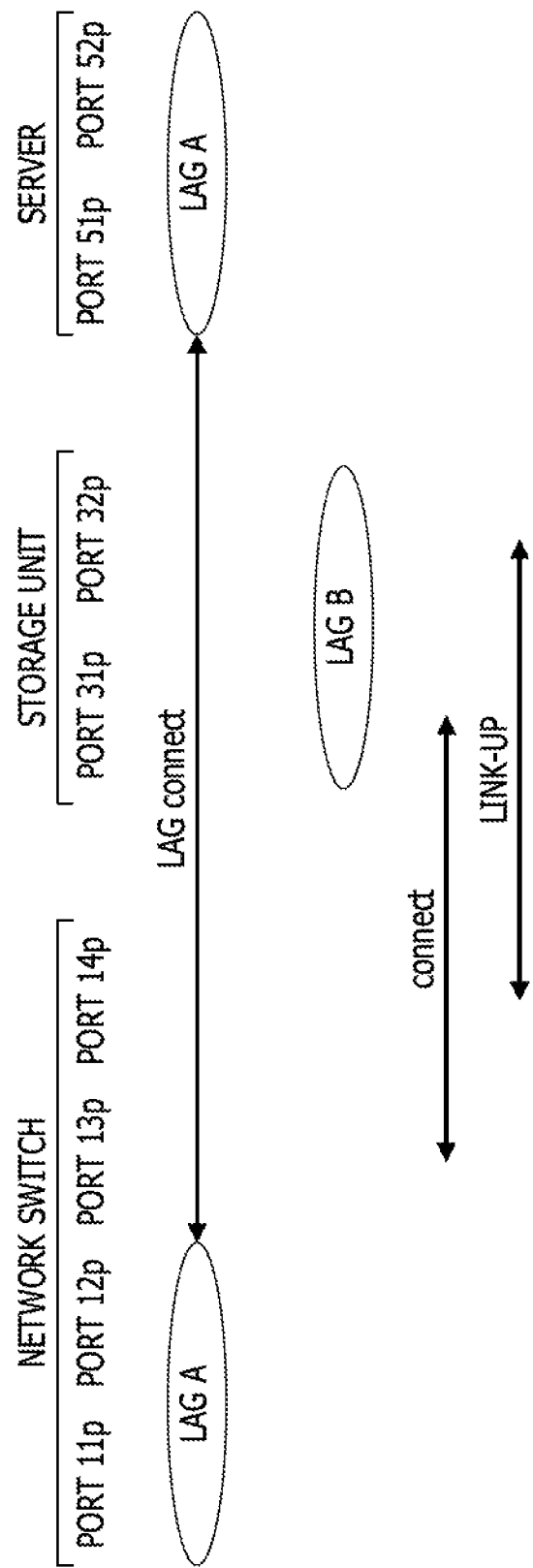
FIG. 4 is a diagram illustrating an example of a state of connection in the system.

Next, a description follows regarding operation of the network switch 1 with reference to FIGS. 4 to 23. It is assumed that a state such as the state illustrated in FIG. 4 is adopted. Namely, the following conditions are satisfied.

(1) A LAG connection is already established between the network switch 1 and the server 5. A LAG configuration file "A" is applied to the ports 11p, 12p, and the ports 51p, 52p. (2) A LAG configuration file "B" is applied to the ports 31p, 32p of the storage device 3. Such LAG configuration is applied correctly. (3) The connection between the port 13p of the network switch 1 and the port 31p of the storage device 3 is already established. This connection is a normal connection, and not a LAG connection.

Then, let us assume that a link-up of the port 14p is newly established in the network switch 1. In the embodiment, the linked-up state is assumed to be a state in which a port is receiving light, but a normal communication is not achieved. It is however also assumed that transmission and reception of LACP frames based on a layer 2 protocol is possible. Normal communication is enabled either when the port adopts a "connect" state or when a LAG connection is established.

FIG. 5 illustrates an example of data stored in the LAG management data storage unit 102 in the initial state. In the example of FIG. 5, port identification information, actor key, partner key, partner system information, information indicating status, and identification information of a LAG configuration file applied to the port are stored in the LAG management data storage unit 102. The LAG management data storage unit 102 is updated by the configuration unit 107 and the avoidance processing unit 108.

Figure 6:
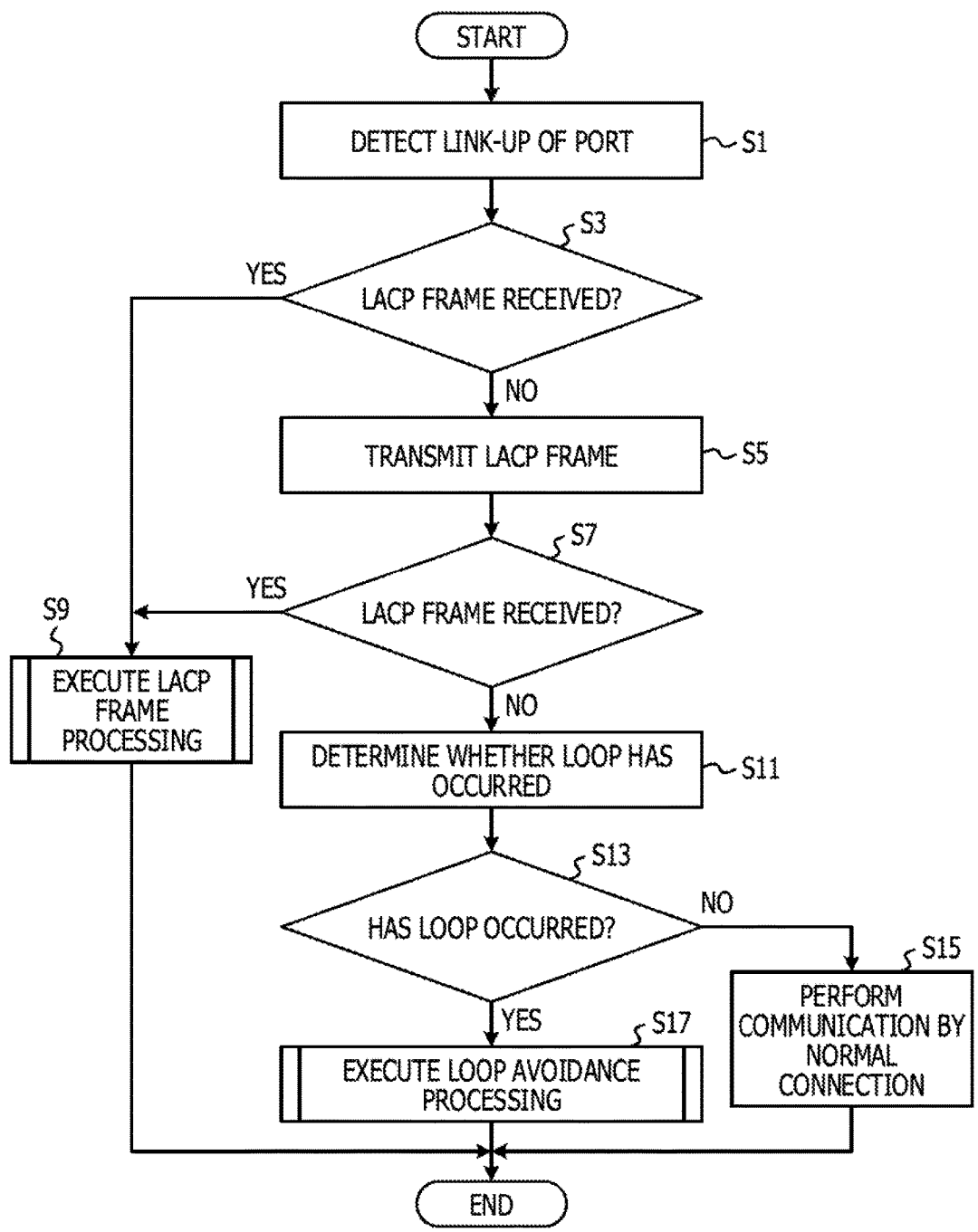
FIG. 6 is a diagram illustrating a main processing flow.

First, the link-up detection unit 103 of the network switch 1 detects that the port 14p of the network switch 1 has been linked up (FIG. 6: S1). The link-up detection unit 103 notifies the LAG determination unit 106 of the link-up in the port 14p.

The LAG determination unit 106 determines whether frames for LACP (hereinafter referred to as LACP frames) have been received through the port 14p (S3).

There are two types of modes (active mode and passive mode) in LACP. In the active mode, a device transmits LACP frames, for example, at a regular interval, performs negotiation with a connection destination device, forming a LAG. In the passive mode, a device does not initiate an action and is maintained in a standby state until LACP frames are received from the connection destination device. As described below, in the embodiment, when the network switch 1 does not receive LACP frames from the connection destination device, the network switch 1 transmits LACP frames to the connection destination device and waits for the response. This enables a LAG to be formed even when the connection destination device is in the passive mode.

Then, when the network switch 1 receives LACP frames through the port 14p (S3: Yes), the port 32p has been applied to the LAG configuration. The configuration unit 107 accordingly executes the LACP frame processing (S9). The LACP frame processing will be explained with reference to FIGS. 7 to 10.

First, the configuration unit 107 notifies the obtaining unit 104 of receipt of LACP frames through the port 14p. In response to the notification, the obtaining unit 104 obtains a partner key and a partner system information from the LACP frames received (FIG. 7: S21). The LAG determination unit 106 notifies the configuration unit 107 of the obtained partner key and the partner system information. Then, the LAG determination unit 106 stores the obtained partner key and the partner system information in the LAG management data storage unit 102.

When the processing of S21 is executed, the LAG management data storage unit 102 is updated to a state such as the state illustrated in FIG. 8. In the state of FIG. 8, the partner key and the partner system have been configured with respect to the port 14p. In addition, the status of the port 14p has been changed from "Connect now" to "Get Info".

The configuration unit 107 reads data stored in the LAG management data storage unit 102 (S23). The configuration unit 107 then determines whether a partner key that matches the partner key that has been obtained in S21 is included in the read data (S25). For example, when the partner key that has been obtained in S21 is "1", this partner key matches the partner keys of the ports 11p to 13p in FIG. 8.

At the time of the processing of S25, the LAG management data storage unit 102 is updated to a state such as the state illustrated in FIG. 9. In the state of FIG. 9, the status of the port 14p has been updated from "Get Info" to "Search".

When a partner key that matches the partner key obtained in S21 is not included in the read data (S25: No), the flow proceeds to the processing of S31. On the other hand, when a partner key that matches the partner key obtained in S21 is included in the read data (S25: Yes), the configuration unit 107 determines whether a partner system corresponding to the partner key determined to be in match matches the partner system obtained in S21 (S27).

When the partner system corresponding to the partner key that has been determined to be in match in S25 matches the partner system obtained in S21 (S27: Yes), it means that a port to which the same LAG configuration is applied already exists in the network switch 1. The configuration unit 107 accordingly reads a LAG configuration file that has been applied to the port for which the partner key and the partner system matches, from the LAG configuration storage unit 101. For example, when the LAG configuration file "B" is the configuration file applied to the port for which the partner key and the partner system matches, the LAG configuration file "B" is read from the LAG configuration storage unit 101. In addition, the configuration unit 107 applies the LAG configuration file, that has been read, to the target port (here, the port 14p which is the linked-up port) (S29). For example, the contents of the file are written onto a storage area of the port 14p. The flow then proceeds to processing of S37.

At the point of time when the processing of S29 completed, the LAG management data storage unit 102 is updated to a state such as the state illustrated in FIG. 10. In the state of FIG. 10, an actor key "2" is newly set to the port 14p that is the same actor key as the port 13p, and "B" is set as the file identification information. Following this, when a LAG connection is formed, the status of the port 14p is updated to "LAG".

As described above, a partner key is a value that may be set to any value by a connection destination device. Therefore, when a "LAG configuration" is searched for using a partner key only, it is possible that a LAG configuration to be applied to a port for communicating with a specified device is applied to a port for communicating with another device. Thus, application of incorrect LAG configuration may be avoided by using partner system information that is information unique to each device.

Figure 7:
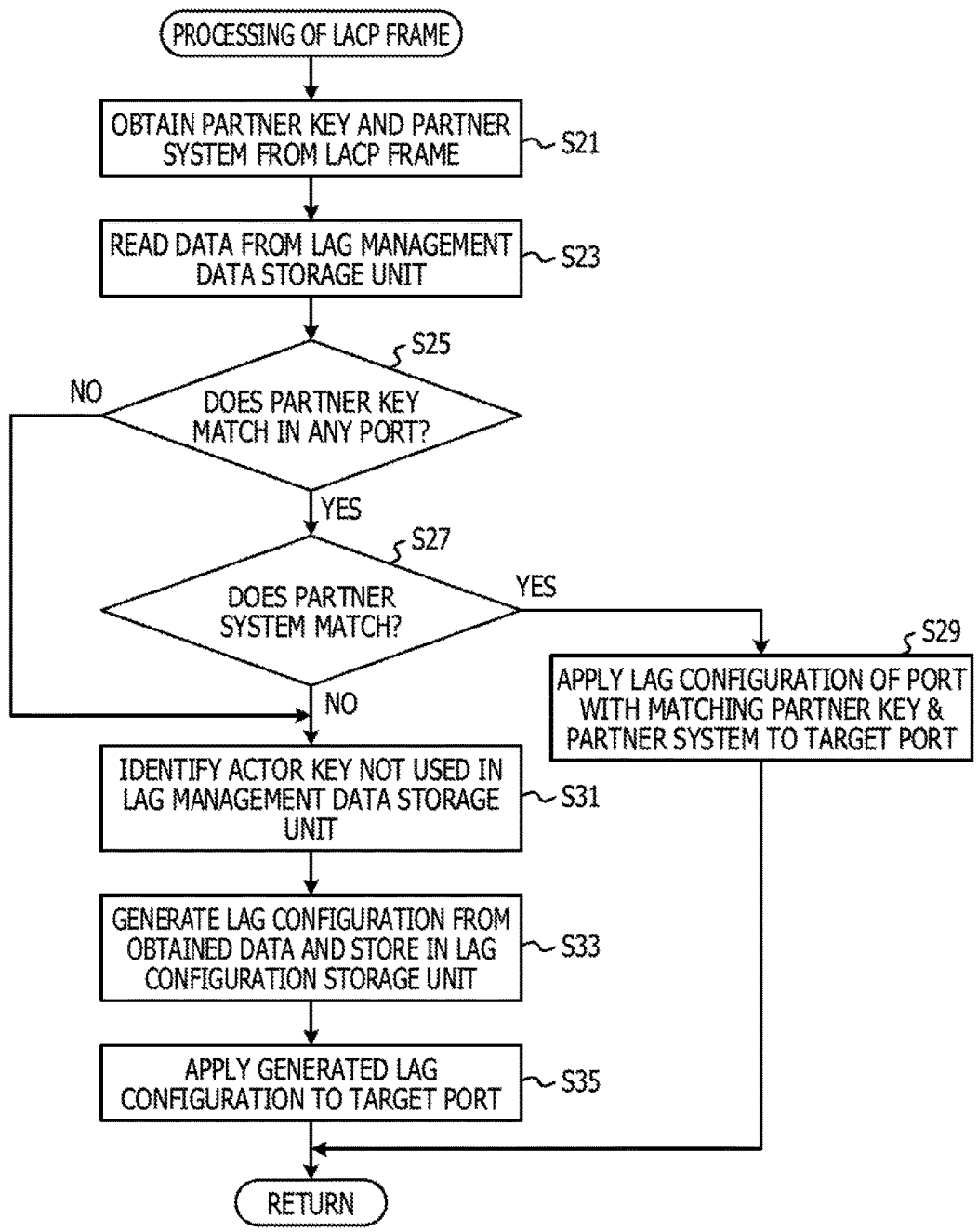
FIG. 7 is a diagram illustrating a processing flow of processing of LACP frames.

Returning to explanation of FIG. 7, if the partner system corresponding to the partner key determined to be in match in S25 does not match the partner system obtained in S21 (S27: No), then it means that a port to which the same LAG configuration is applied does not currently exist in the network switch 1. The configuration unit 107 accordingly identifies an actor key that is not used in the LAG management data storage unit 102 (S31). For example, when actor key "1" is the only actor key stored in the LAG management data storage unit 102, actor key "2" is identified in S31 as the actor key not used.

The configuration unit 107 generates a LAG configuration file from the data obtained in S21 (for example, a partner key) and stores the generated LAG configuration file in the LAG configuration storage unit 101 (S33). Identification information different from that of other LAG configuration file is given to the LAG configuration file generated in S33.

The configuration unit 107 applies the LAG configuration file generated in S33 to the target port (here, the port 14p) (S35). For example, the contents of the file are written onto the storage area for the port 14p. Then, the flow returns to the calling process.

If the LAG configuration file "A" is applied to the ports 13p and 14p, as the LAG configuration of the ports 13p and 14p and the LAG configuration of the ports 31p and 32p do not match each other, the LAG configuration ends up incorrect.

Following this, the LAG management data storage unit 102 is updated, for example, to a state such as the state illustrated in FIG. 11. In the state of FIG. 11, the status has been updated to "LAG" for each of the ports 13p and 14p.

Figure 12:
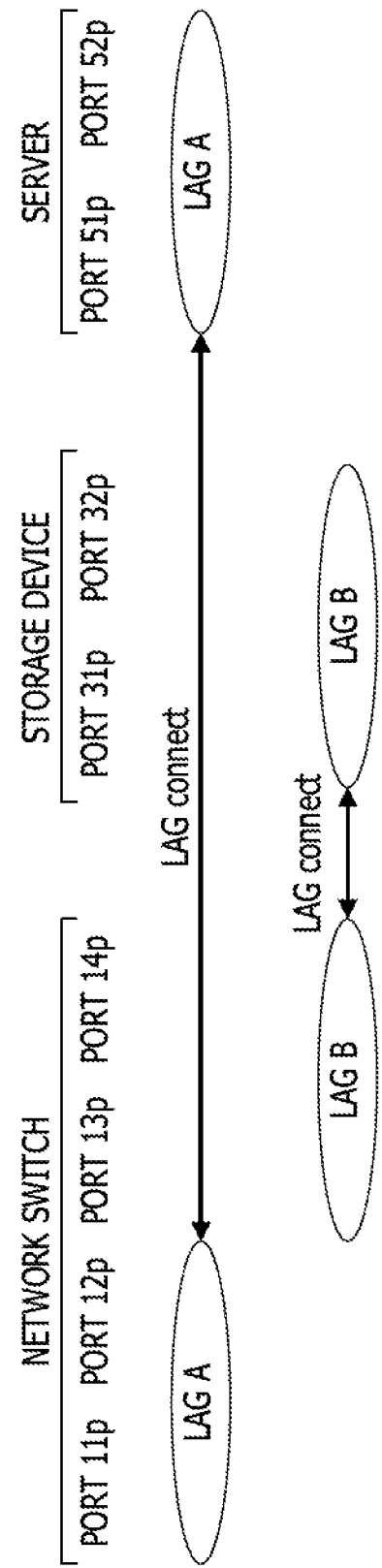
FIG. 12 is a diagram illustrating an example of a state of connection in the system.

At this point, a state such as the state illustrated in FIG. 12, for example, is adopted. In the state of FIG. 12, the LAG connection has already been established between the network switch 1 and the server 5. The LAG configuration file "A" is applied to the ports 11p, 12p and the ports 51p, 52p. The LAG connection is established between the network switch 1 and the storage device 3. In addition, the LAG configuration file "B" is applied to the ports 13p, 14p and the ports 31p, 32p.

Returning to explanation of FIG. 6, when the network switch 1 does not receive LACP frames (S3: No), the LAG determination unit 106 generates LACP frames and transmits the generated LACP frames to the storage device 3 that is the connection destination device for the port 14p, through the port 14p (S5). The generated LACP frames include a partner key and partner system information. Here, the partner key may have any value.

The LAG determination unit 106 determines whether LACP frames have been received through the port 14p (S7) after a certain time period has elapsed from the processing of S5.

When LACP frames have been received through the port 14p (S7: Yes), LAG configuration has been applied to the port 32p. The flow thus proceeds to the processing of S9. On the other hand, when the LACP frames are not received through the port 14p (S7: No), LAG configuration has not been applied to the port 32p. In this case, the loop detection unit 105 determines whether a loop has occurred due to a connection between the ports 14p and 32p established after the completion of the link-up (S11). The occurrence of the loop is detected, for example, by monitoring a packet relayed by the network switch 1. Normally, a loop occurs when plural ports to which LAG configuration is not applied are coupled to the same device. A loop may also occur when an incorrect LAG configuration is applied.

When a loop has not occurred (S13: No), the network switch 1 performs normal, non-LAG communication through the port 14p (S15).

On the other hand, when a loop has occurred (S13: Yes), the loop detection unit 105 notifies the avoidance processing unit 108 of the occurrence of a loop.

At this point, the LAG management data storage unit 102 is updated to a state such as the state illustrated in FIG. 13. In the state of FIG. 13, the ports 13p and 14p are set at a "loop" state. For the port 13p, information other than the information on the status may be set, but omitted here to facilitate viewing of the diagram.

The avoidance processing unit 108 then executes loop avoidance processing in response to the notification from the loop detection unit 105 (S17). The processing then ends. Explanation follows regarding the loop avoidance processing with reference to FIGS. 14 to 23.

Figure 14:
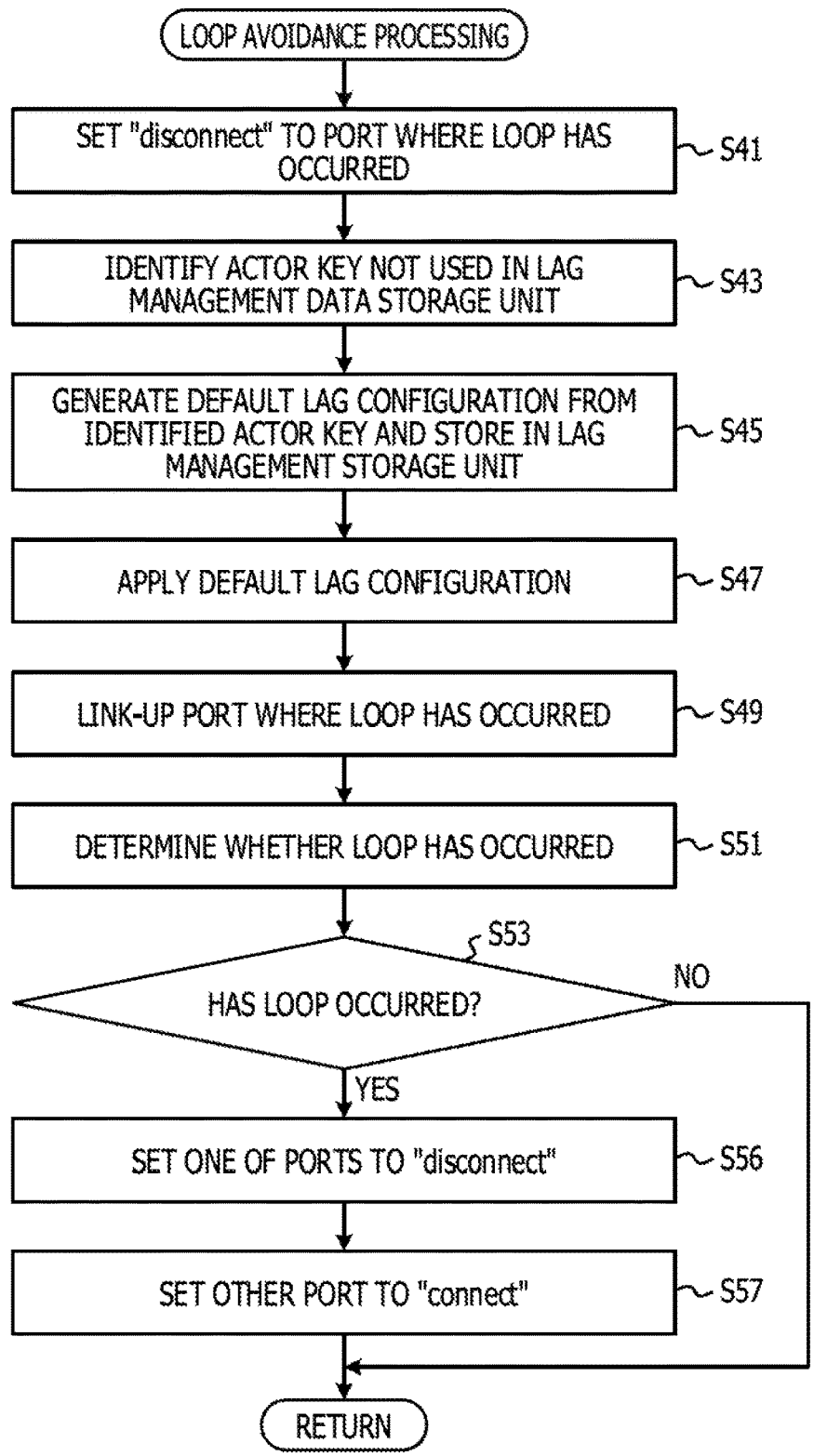
FIG. 14 is a diagram illustrating a processing flow of loop avoidance processing.

First, the avoidance processing unit 108 sets a port in which a loop has occurred to a "disconnect" state (S41 in FIG. 14). In the embodiment, the port set to a "disconnect" state is shut down and adopts a state in which communication is disabled.

At the time of completion of the processing of S41, the LAG management data storage unit 102 is updated to a state such as the state illustrated in FIG. 15. In the state of FIG. 15, the ports 13p and 14p are set to a "disconnect" state.

Figure 16:
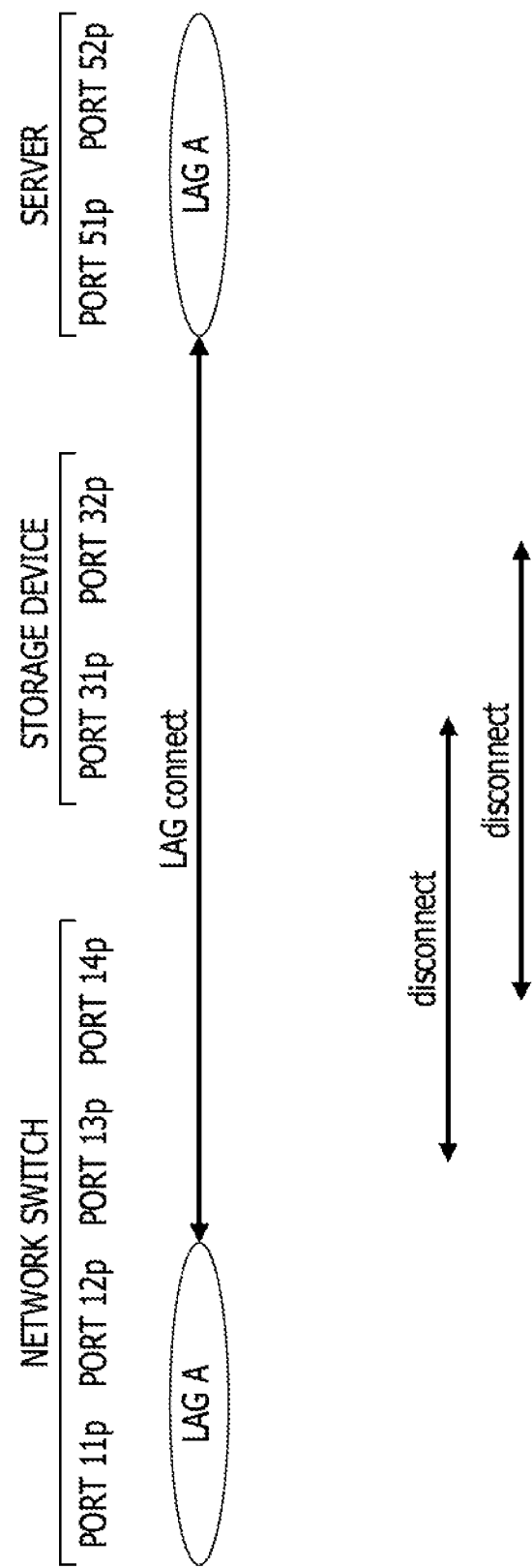
FIG. 16 is a diagram illustrating an example of a state of connection in the system.

A state such as the state illustrated in FIG. 16 is adopted when the processing of S41 is completed. In the state of FIG. 16, the LAG connection is already established between the network switch 1 and the server 5. In addition, the LAG configuration file "A" is applied to the ports 11p, 12p and the ports 51p, 52p. On the other hand, connection is not established and communication is in a disabled state between the ports 13p and 31p and between the ports 14p and 32p.

Returning to explanation of FIG. 14, the avoidance processing unit 108 identifies an actor key that is not used in the LAG management data storage unit 102 (S43).

The avoidance processing unit 108 generates a default LAG configuration file from the actor key identified in S43, and stores the generated LAG configuration file in the LAG configuration storage unit 101 (S45). Identification information different from other files is given (here, "default") to the LAG configuration file that has been generated in S45.

The avoidance processing unit 108 applies the LAG configuration file generated in S45 to the ports in which a loop has occurred (here, the ports 13p and 14p) (S47).

At the point of time when the processing of S47 completed, the LAG management data storage unit 102 is updated to a state such as the state illustrated in FIG. 17. In the state of FIG. 17, the actor key "2" and file identification information "default" are set for the ports 13p and 14p.

Figure 18:
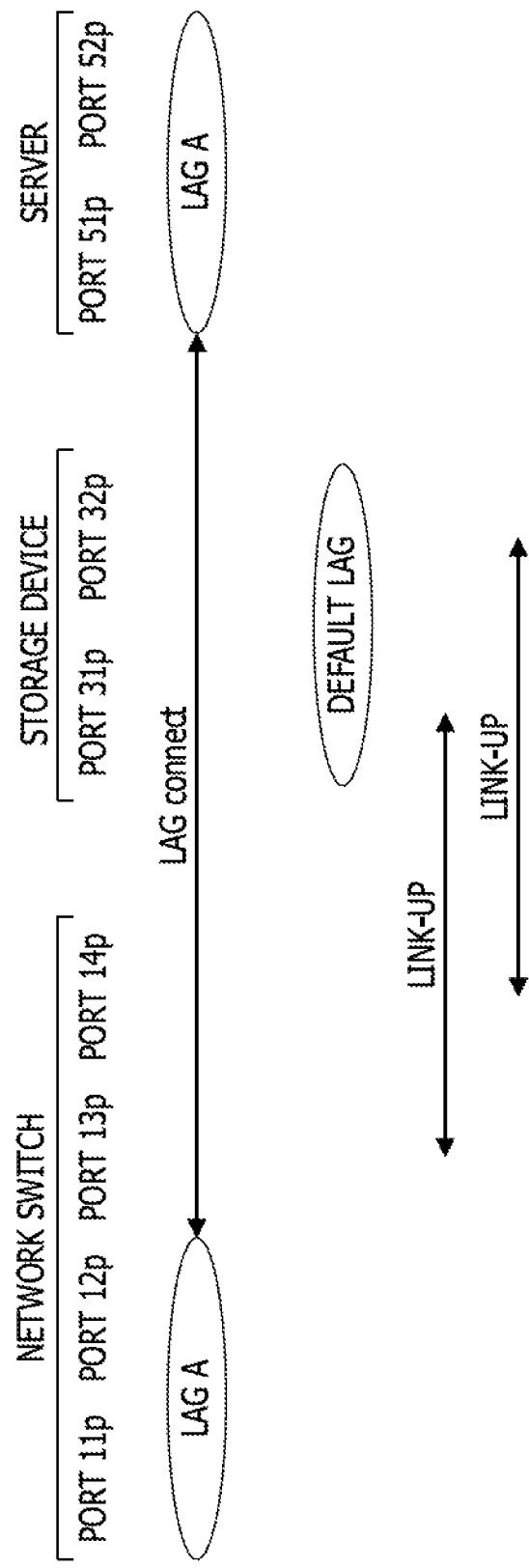
FIG. 18 is a diagram illustrating an example of a state of connection in the system.

The avoidance processing unit 108 performs a link-up of the ports 13p and 14p that are the ports in which a loop has occurred (S49). In S49, "disconnect" state set to the ports 13p and 14p is removed, enabling L2 communication by the ports 13p and 14p. With this, a state such as the state illustrated in FIG. 18 is adopted. In the state of FIG. 18, the LAG connection is already established between the network switch 1 and the server 5. The LAG configuration file "A" is applied to the ports 11p, 12p and the ports 51p, 52p. On the other hand, the ports 13p and 14p adopt a linked-up state.

Moreover, when the connection between the ports 13p and 31p and the connection between the ports 14p and 32p are established, the LAG management data storage unit 102 is updated to the state illustrated in FIG. 19. In the state of FIG. 19, the ports 13p and 14p are set to the "connect" state.

Returning to explanation of FIG. 14, the avoidance processing unit 108 instructs the loop detection unit 105 to check for an occurrence of a loop. The avoidance processing unit 108 determines whether a loop has occurred based on the check result received from the loop detection unit 105 (S51). When a LAG is formed, and a loop has not occurred (S53: No), the flow returns to the calling process.

When a LAG is formed, the LAG management data storage unit 102 is updated to a state such as the state, for example, illustrated in FIG. 20. In the state of FIG. 20, the ports 13p and 14p are set to the "LAG" state. A partner key and a partner system information for the ports 13p and 14p are set obtaining data from the storage device 3. Thus, such values are not limited to the values illustrated in FIG. 20.

Figure 21:
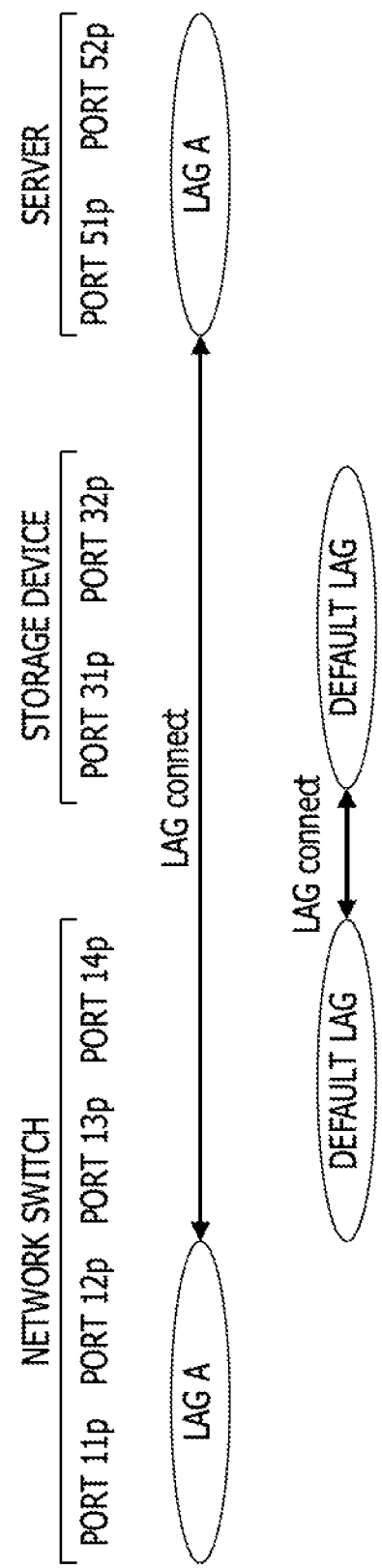
FIG. 21 is a diagram illustrating an example of a state of connection in the system.

When a LAG is formed, a state such as the state illustrated in FIG. 21 is adopted. In the state of FIG. 21, the LAG connection is already established between the network switch 1 and the server 5. In addition, the LAG configuration file "A" is applied to the ports 11p, 12p and the ports 51p, 52p. The LAG connection is already established between the network switch 1 and the storage device 3. In addition, a default LAG configuration file is applied to the ports 13p, 14p and the ports 31p, 32p.

Here, cases in which a LAG is formed are the cases in which the storage device 3 may also execute the processing according to the embodiment or in which a LAG is set up to the storage device 3 manually. Thus, a LAG is not formed except for such cases.

Returning to explanation of FIG. 14, when a loop occurred (S53: Yes), the avoidance processing unit 108 sets one out of the ports in which the loop has occurred (here, the ports 13p and 14p) to "disconnect" (S55). Namely, one port is shut down and adopts a state in which communication is disabled. The loop is thereby broken.

The avoidance processing unit 108 sets the other port out of the ports in which the loop has occurred (here, the ports 13p and 14p) to "connect" (S57). However, when the port is already set to "connect", the processing of S57 is omitted.

When the processing of S57 is completed, the LAG management data storage unit 102 is updated, for example, to a state such as the state illustrated in FIG. 22. In the state of FIG. 22, the status of the port 13p is set to "disconnect". The port 14p is set with the actor key "2", the status "connect", and the file identification information "default".

Figure 23:
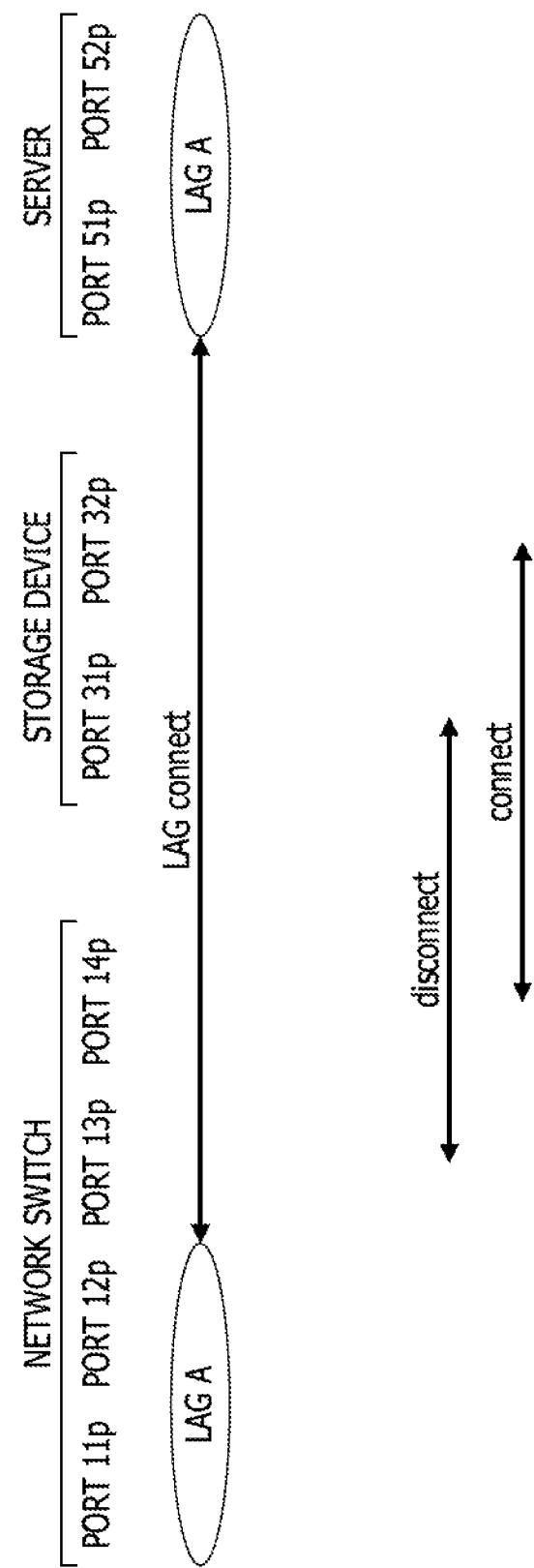
FIG. 23 is a diagram illustrating an example of a state of connection in the system.

When the processing of S57 is completed, a state such as the state illustrated in FIG. 23 is adopted. In the state of FIG. 23, the LAG connection is already established between the network switch 1 and the server 5. In addition, the LAG configuration file "A" is applied to the ports 11p, 12p and the ports 51p, 52p. A connection is established between the port 14p and the port 32p. However, a connection is not established between the port 13p and the port 31p.

By executing the above-described processing, a proper LAG configuration may be applied to the network switch 1 automatically, without a troublesome operation performed by an administrator or the like. When a configuration error occurs, a LAG is not formed correctly causing a packet to loop in a path that is to be redundant. This significantly impacts the entire system. However, such situation does not occur with the method according to the embodiment.

The embodiments are based on a standardized LACP, thereby enabling automation of LAG configuration to be achieved without depending on a vendor or the type of a connection destination device.

The embodiments of the technology disclosed herein are described above, but the technology disclosed herein is not limited to the embodiments. For example, the above-described function block configuration of the network 1 may not correspond to the actual program module configuration.

The configuration of each of the tables described above is an example and it is unnecessary that each table is configured as described above. In addition, the order of processing flow may be changed as long as the processing result does not change. Further, processing may be executed in parallel.

Figure 24:
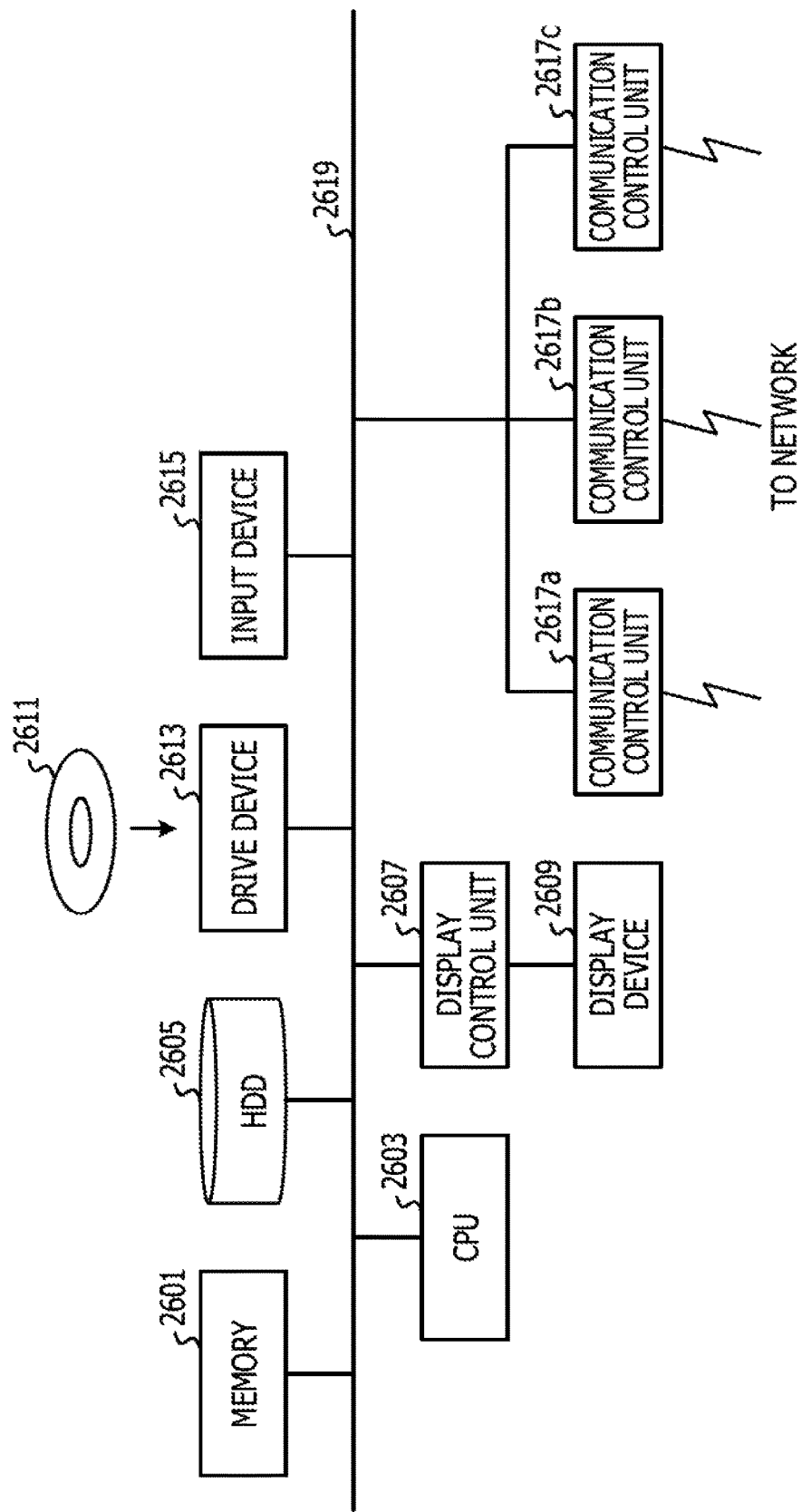
FIG. 24 is a functional block diagram of a network switch.

As illustrated in FIG. 24, the above-described network switch 1 may have a configuration in which a memory 2601, a central processing unit (CPU) 2603, a hard disk drive (HDD) 2605, a display control unit 2607 coupled to a display device 2609, a drive device 2613 for a removable disk 2611, an input device 2615, and communication control units 2617 for connecting to a network (2617a to 2617c in FIG. 24) are coupled to each other through a bus 2619. In some cases, the display control unit 2607, the display device 2609, the drive device 2613, and the input device 2615 are not included in the network switch 1. An operating system (OS) and an application program for executing the processing in the embodiment are stored in the HDD 2605. When the OS and the application program are executed by the CPU 2603, the OS and the application program are read from the HDD 2605 to the memory 2601. The CPU 2603 controls the display control unit 2607, communication control unit 2617, and the drive device 2613, as appropriate, such that desired operations are performed. Data that has been input through any one of the communication control units 2617 is output through another of the communication control units 2617. The CPU 2603 switches an output destination of the data appropriately by controlling the communication control unit 2617. Data in the middle of processing is stored in the memory 2601 and stored in the HDD 2605 as appropriate.

In the embodiments of the technology, the application program for executing the above-described processing is distributed stored in the computer-readable removable disk 2611 and installed in the HDD 2605 from the drive device 2613. Alternatively, the application program may be installed on to the HDD 2605 through a network such as the Internet and the communication control unit 2617. Such computer devices realize various functions described above, due to the hardware such as the CPU 2603 and memory 2601, the OS, and the desired application program cooperating together organically.

The above-described embodiments of the technology are summarized as follows.

A relay device of a first aspect of the embodiment disclosed herein includes (A) a first port coupled to a first device, (B) a first processing unit that extracts identification information on the first device and identification information on LAG configuration applied to the first device, from a frame received through the first port, and (C) a second processing unit that determines LAG configuration to be applied to the first port, based on the identification information on the first device and the identification information on the LAG configuration applied to the first device, respective identification information having been extracted by the first processing unit.

This enables the LAG configuration to be applied to the first port to be determined without an error, thereby enabling LAG configuration of the relay device to be performed appropriately.

The relay device may further include (D) a data storage unit that stores identification information on LAG configuration to be applied to a port coupled to a device, associated with identification information on the device and identification information on LAG configuration applied to a port of the device. In addition, (c1) the second processing unit may read the identification information on the LAG configuration to be applied to the first port, which is associated with the identification information on the first device and with the identification information on the LAG configuration of the first device, from the data storage unit, and may apply the LAG configuration identified by the identification information that has been read, to the first port. This enables the relay device to handle a situation in which another port exists, to which the same LAG configuration is applied.

(c2) The second processing unit may generate LAG configuration from the identification information on the LAG configuration that has been applied to the first device and apply the generated LAG configuration to the first port, when the identification information on the LAG configuration to be applied to the first port, which is associated with the identification information on the first device and the identification information on the LAG configuration of the first device, is not stored in the data storage unit. This enables the relay device to handle a situation in which another port does not exist, to which the same LAG configuration is applied.

The relay device may further include (E) a third processing unit that determines whether a frame has been received from the first port and transmits a frame from the first port when the third processing unit determines that a frame is not received from the first port. There is a mode in a certain protocol in which a frame is not transmitted unless a frame is received from a connection destination device. The measure described above enables a situation to be handled even if the first device adopts such a mode.

The relay device may further include (F) a fourth processing unit that determines whether a loop occurs due to the first port when a frame is not received from the first port after a frame has been transmitted from the first port, and applies a new LAG configuration to the first port, when the fourth processing unit has determined that a loop occurs due to the first port. This enables an occurrence of a failure due to a loop to be avoided.

The relay device may further include (G) a fifth processing unit that determines whether a loop occurs due to the first port when a frame is not received from the first port after a frame has been transmitted from the first port, and executes processing to prohibit communication through at least one of the plural ports in which a loop has occurred, when the fifth processing unit has determined that a loop occurs due to the first port. This enables an occurrence of a failure due to a loop to be avoided.

The frame may be a LACP frame. In addition, the identification information on the device is information on a partner system in the LACP, and the identification information on the LAG configuration applied to the port of the device may be a partner key in the LACP.

A configuration method of a second aspect of the embodiment disclosed herein includes processing of (H) extracting identification information on a first device and identification information on LAG configuration applied to the first device, from a frame received through a first port coupled to the first device, and (I) determining LAG configuration to be applied to the first port based on the extracted identification information on the first device and the extracted identification information on the LAG configuration applied to the first device.

A program for causing a processor to execute processing by the above-described method may be created, and the program is stored, for example, in a computer-readable storage medium or storage device such as a flexible disk, a compact disc-read-only memory (CD-ROM), a magneto optical disk, a semiconductor memory, or a hard disk. Note that an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
a port coupled to another device; and
a processor coupled to the port and configured to:
extract identification information on the other device and identification information on a link aggregation group (LAG) configuration applied to the other device, from a frame received through the port, and
determine LAG configuration to be applied to the port based on the identification information on the other device and the identification information on the LAG configuration applied to the other device,
determine whether a first frame has been received through the port,
transmit a second frame to the other device through the port when it is determined that the first frame has not been received through the port, determine whether a loop occurs at the port when a third frame is not received through the port after the second frame is transmitted through the port, and
apply another LAG configuration to the port when it is determined that the loop occurs at the port.

2. The relay device according to claim 1, wherein the processor is further configured to read the identification information on the LAG configuration to be applied to the port, which is associated with the identification information on the other device and the identification information on the LAG configuration of the other device, from the LAG management data in which identification information on the other device, identification information on the LAG configuration to be applied to the port of the other device, and the identification information on LAG configuration to be applied to the port coupled to the other device are associated with each other, and apply the LAG configuration identified by the read identification information to the port.

3. The relay device according to claim 2, wherein the processor is further configured to execute communication with the other device using the applied LAG configuration.

4. The relay device according to claim 2, wherein the processor is configured to generate LAG configuration from the identification information on the LAG configuration applied to the other device and apply the generated LAG configuration to the port when the identification information on the LAG configuration to be applied to the port does not exist in the LAG management data.

5. The relay device according to claim 1, wherein the processor is further configured to:
determine whether a loop occurs due to the port when a frame is not received from the port after a frame is transmitted from the port, and
execute processing for prohibiting communication through at least one of a plurality of ports in which a loop occurred when it is determined that a loop occurs due to the port.

6. The relay device according to claim 1, wherein
the frame is a frame of a link aggregation control protocol (LACP), and
the identification information on the device is information on a partner system in the LACP, and
the identification information on the LAG configuration applied to the port of the device is a partner key in the LACP.

7. The relay device according to claim 6, wherein the information on the partner system is information unique to a connection destination device.

8. A method of relaying executed by a processor included in a relay device, the method comprising:
extracting identification information on another device and identification information on LAG configuration applied to the other device, from a frame received through a port coupled to the other device;
determining LAG configuration to be applied to the port based on the identification information on the other device and the identification information on the LAG configuration applied to the other device;
determining whether a first frame has been received through the port;
transmitting a second frame to the other device through the port when it is determined that the first frame has not been received through the port;
determining whether a loop occurs at the port when a third frame is not received through the port after the second frame is transmitted through the port; and
applying another LAG configuration to the port when it is determined that the loop occurs at the port.

9. A non-transitory computer-readable recording medium storing a program that causes a processor included in a relay device to execute a process, the process comprising:
extracting identification information on another device and identification information on LAG configuration applied to the other device, from a frame received through a port coupled to the other device;
determining LAG configuration to be applied to the port based on the identification information on the other device and the identification information on the LAG configuration applied to the other device;
determining whether a first frame has been received through the port;
transmitting a second frame to the other device through the port when it is determined that the first frame has not been received through the port;
determining whether a loop occurs at the port when a third frame is not received through the port after the second frame is transmitted through the port; and
applying another LAG configuration to the port when it is determined that the loop occurs at the port.

* * * * *